June 23, 1959   G. A. PATTERSON ET AL   2,891,622
WELL TREATING APPARATUS
Filed July 16, 1954

Inventors
Glenn A. Patterson
Elmer M. Dieters
McCanna and Morsbach
Attys

////# United States Patent Office 2,891,622
Patented June 23, 1959

2,891,622

WELL TREATING APPARATUS

Glenn A. Patterson and Elmer M. Deters, Davenport, Iowa, assignors to Red Jacket Manufacturing Co., Davenport, Iowa, a corporation of Iowa Application July 16, 1954, Serial No. 443,876

14 Claims. (Cl. 166—68)

This invention relates to water supply systems and more particularly to a supply system having apparatus for treating the water at the well.

Materials having sequestering and deflocculating properties, a common form of which are the glass-like polyphosphates have been heretofore used in the treatment of water to prevent the precipitation of the dissolved iron and manganese in the water, and to control corrosion and inhibit the formation of lime scale on the water supply equipment. These materials are commonly introduced into the water after it has been pumped from the well and when used in this manner are effective to prevent subsequent precipitation of iron and manganese from the water as well as inhibit corrosion and the formation of lime scale on the water supply equipment through which the treated water flows. However, precipitation of the dissolved iron, which occurs upon exposure to air, or due to excessive agitation of the water, has often occurred to a considerable extent before the treatment material is introduced into the supply system so that the treatment with the sequestering material is only partially effective. Moreover, the introduction of the sequestering material into the water after it has been pumped from the well in no manner protects the equipment such as the screens, piping, valves and other pumping equipment located in the well, against corrosion or lime scaling.

It is an object of the present invention to provide a water supply system wherein a sequestering material is introduced into the water before the latter is agitated or exposed to air so that precipitation of the dissolved iron or the like is prevented.

Another object of this invention is the provision of a water supply including a well having novel treatment apparatus wherein all of the water supply equipment including that located in the well is protected against corrosion and the formation of lime scale.

Another object of this invention is the provision of a water supply system wherein the water treating apparatus is located within the well and feeds a sequestering material into the water in the well, thereby preventing precipitation of iron and the like due to the exposure of the water to air in the well and also to prevent corrosion and the formation of lime scale on the screens, pipe, and pumping equipment in the well.

Yet another object of this invention is the provision of water treating apparatus which is adapted to be located within the well and which may be easily refilled with a sequestering material from the top of the well, without removing the treating apparatus therefrom.

Still another object of this invention is the provision of a well water supply system having a water treating apparatus mounted on the adapter unit of an underground discharge unit and arranged to divert a portion of the water flowing out through the underground discharge unit through the treating apparatus and to return the diverted water containing dissolved sequestering material from the treating apparatus to the water in the well casing below the adapter unit.

These, together with various ancillary objects and advantages of this invention will be more readily appreciated as the same becomes better understood by reference to the following detailed description when taken in connection with the accompanying drawings wherein.

Figure 5:
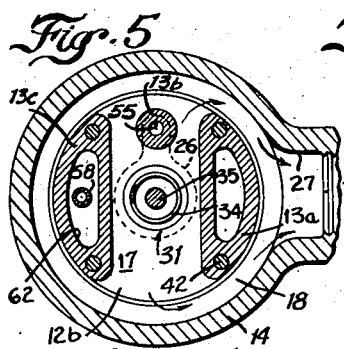
Fig. 5 is a horizontal sectional view on a reduced scale taken on the plane 5—5 of Fig. 2.
Figure 4:
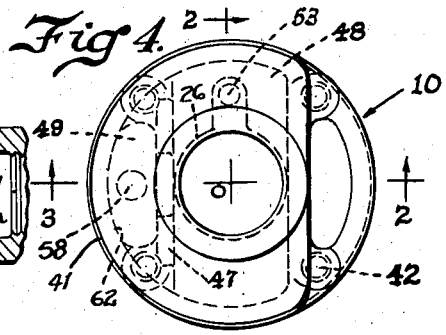
Fig. 4 is a top plan view of the water treating apparatus shown mounted on the adapter unit of the underground pitless discharge unit.

The water treating apparatus, indicated generally by the numeral 10, is adapted to supply a material such as the glass-like polyphosphates commonly called hexametaphosphate having sequestering and deflocculating properties into the water in the well to thereby treat the water at the well and prevent the precipitation of iron and manganese from the water, as occurs upon exposure to air or also excessive agitation, and also to prevent corrosion and the formation of lime deposits on any of the water supply equipment. Such materials, sold under the trade name of "Calgon," and "Micromet" by Calgon, Inc. and "Nalco M-12" sold by the National Aluminate Corporation, have heretofore been extensively used in the treatment of water to prevent the precipitation of iron and also inhibit corrosion and the formation of lime scale in the water system. However, prior apparatus for feeding such material into the water supply system have been arranged to feed the material into the water after it has been pumped from the well and consequently are not effective to prevent corrosion or the formation of lime scale on the water supply equipment located in the well nor is the treatment completely effective to prevent the precipitation of iron since some precipitation occurs in the well upon exposure of the water therein to air. In accordance with the present invention, the water treating apparatus 10 is arranged to feed the aforementioned materials, hereinafter referred to as sequestering materials, into the water in the well to treat the water before it is pumped from the well. Consequently, precipitation of the dissolved iron and manganese in the water is not produced by the exposure of water in the well to air, as occurs during pumping of the water, due to agitation in the pump and due to "draw-down" of the water in the well which exposes the water bearing strata in the well to the air therein.

As shown in the accompanying drawings, the water treating apparatus 10 is employed in a well having a casing 11, although it is to be understood that the apparatus is not so limited and that it may also be used in wells which do not have casings. The upper end of the casing 11 has an underground pitless discharge unit attached thereto which, as is conventional, comprises a discharge head 14 having an outlet 27 and an annular inwardly opening passage 18 communicating with said outlet, and a casing extension 15 which extends from the discharge head to a point above the ground level.

The casing extension 15 is conventionally formed with a somewhat greater inside diameter than the well casing 11, and an adapted unit or thimble 16 is removably disposed within the discharge head. The adapter unit is constructed so as to form a seal across the discharge head and comprises a casting having top and bottom walls 12a and 12b which are spaced apart by posts 13a, 13b and 13c. The posts are annularly spaced apart around a central chamber 17, which chamber opens at the side of the thimble through the spaces between the posts 13a—13c (see Figs. 1 and 5) and communicates with the annular passage 18 in the discharge body 14. The thimble has spaced annular grooves 19 and 21 formed in the periphery of the top and bottom walls thereof which carry O-rings 22 and 23 cooperating with the discharge body 14 to form a seal thereacross above and below the annular passage 18. The discharge body has an annular flange 24 against which the lower side of the thimble bears for the purpose of supporting the thimble and associated mechanism in the well.

A delivery pipe 25 has its upper end threaded into the thimble 16 and communicates with the downwardly facing opening 26 therein, so that the water flowing upwardly through the delivery pipe passes through the central chamber 17, then outwardly between the posts 13a—13c to the annular chamber 18 and from the chamber 18 out through the lateral discharge outlet 27 to the service line. Any desired means may be provided for pumping the water from the well up through the delivery pipe 25 and is here shown as a submersible pump 28 attached to the lower end of the delivery pipe 25 below the water level in the well.

A check valve 31 may conveniently be mounted so as to prevent return flow from the central chamber 17 through the downwardly facing opening 26 into the delivery pipe 25 and, as shown in the drawings, comprises a valve member having a resilient face 32 adapted to seat on the annular seat 33 and spring biased to its closed position by a spring 34. The stem 35 on the spring is guidably mounted in a spider 36, against which the upper end of the spring 34 abuts, and the spider is retained in position on the adapter unit by the water treatment apparatus 10, in a manner described more fully hereinafter.

Figure 1:
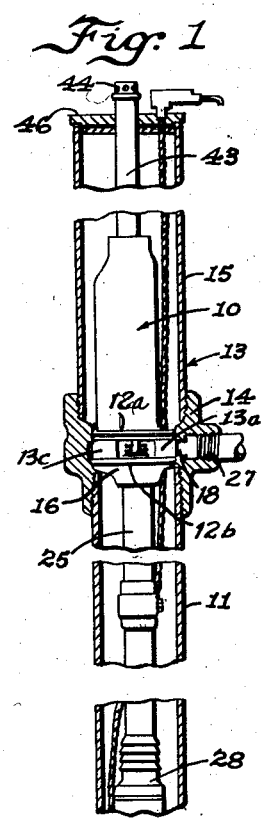
Figure 1 is a fragmentary vertical section through the well showing the invention.

The water treatment apparatus comprises a housing 41 having the lower end thereof attached as by fasteners 42 to the upper face of the adapter unit 16, the housing extending upwardly in the casing extension 15 and having a drop pipe 43 threadedly attached to the upper end thereof to extend out through the top of the well casing. A ventilating cap 44 is attached to the upper end of the drop pipe and is removable therefrom to permit refilling of the water treatment apparatus through the drop pipe. As best shown in Fig. 1, the drop pipe 43 is sealed to the casing by a casing seal 46 mounted on the upper end of the casing extension 15.

Figure 3:
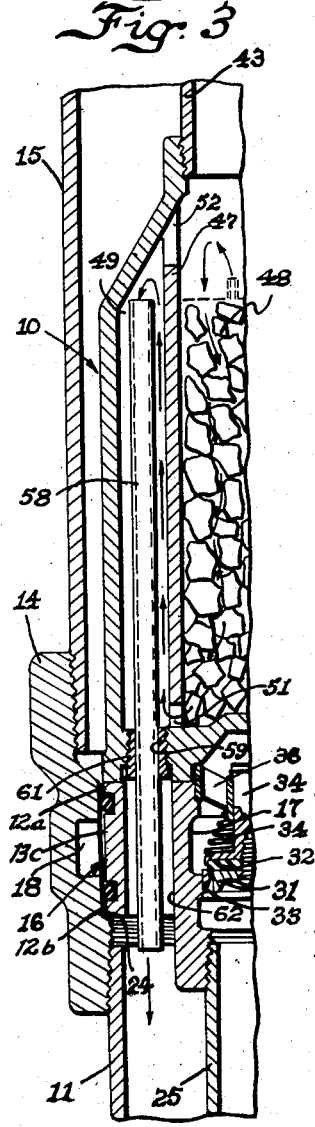
Fig. 3 is an enlarged fragmentary vertical sectional view taken on the plane 0—3 of Fig. 4.

The housing 41 is separated, by an upstanding partition 47, into a storage compartment 48 and an outlet compartment 49. As shown in Fig. 3, the partition 47 is laterally offset from the open upper end of the housing so that when the storage compartment 48 is filled through the drop pipe 43, the sequestering material does not flow into the outlet compartment 49. The partition 47 is provided with an opening 51 adjacent the bottom, for reasons to be described more fully hereinafter, and is also provided with an opening 52 adjacent the upper end thereof.

An inlet conduit 53 extends into the housing 41 through the bottom thereof and is sealed thereto by a gland 54, the lower end of which conduit communicates through a passage 55 in the post 13b in the adapter unit 16 with the downwardly facing opening 26 whereby a portion of the water which flows upwardly through the delivery pipe 25 is bypassed through the inlet conduit 53 into the storage chamber. The inlet conduit is provided with a flow restricting plug 56 therein and the conduit extends upwardly into the storage chamber to a point spaced slightly below the opening 52 in the partition, and above the level of the sequestering material in the storage compartment. An outlet conduit 58 extends through an opening 59 in the bottom wall of the housing 41, and is sealed thereto by a gland 61, the upper end of the outlet conduit terminating within the outlet chamber 49 substantially at the level of the sequestering material in the storage chamber. The lower end of the outlet conduit extends through a passage 62 in the post 13c in the adapter unit whereby the water flowing through the outlet conduit is discharged into the well casing below the adapter unit.

Figure 2:
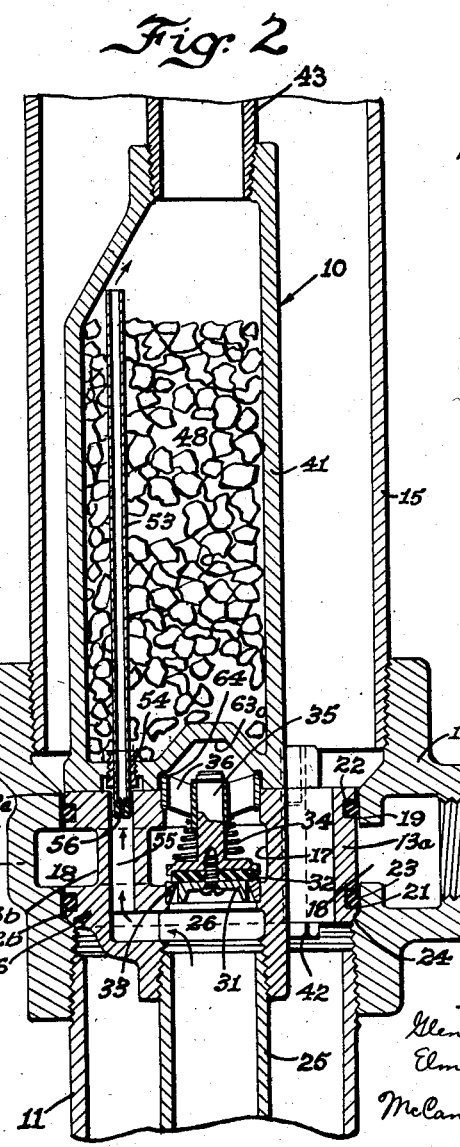
Fig. 2 is an enlarged vertical sectional view taken on the plane 2—0—2 of Fig. 4.

As best shown in Fig. 2, the bottom of the housing 41 is depressed, as shown at 63, to permit the valve stem 35 to move upwardly therein, and is provided with an annular shoulder 64 adapted to abut against the spider 36 to retain the latter in position on the adapter unit when the housing is attached thereto.

In operation of the water supply system, whenever the pump is operated to pump water upwardly through the delivery pipe 25 and out through the discharge outlet 27, a portion of the water is diverted through the passage 55, through flow restricting plug 56 and the inlet conduit 53 where it is discharged into the top of the bed of sequestering material contained in the storage compartment 48. The water flows downwardly through the bed until the water level in the storage and outlet compartments 48 and 49 respectively reaches the level of the top of the discharge conduit 58. Thereafter, when the pump is again operated, the water flowing in through the inlet conduit 53 to the top of the bed of sequestering material causes a portion of the water in the storage chamber to be displaced through the opening 51 in the bottom of the partition into the outlet compartment and a corresponding quantity of water is then displaced from the outlet compartment through the discharge conduit 58 into the well. Since the bed of exchange material presents a certain hydraulic impedance to the flow therethrough, it is apparent that the liquid level in the storage compartment will be slightly above the upper end of the discharge conduit in the outlet compartment, when water is flowing into the storage compartment through the inlet conduit, as occurs whenever the pump is in operation. Consequently, after the pump has stopped, the water and dissolved sequestering material will continue to flow at a limited rate out through the discharge conduit until the levels in the inlet and outlet chambers are equalized. This provides a charge of treating material to the water in the well which treats the water therein and prevents oxidation of the dissolved iron in the water. Moreover, since the water is treated in the well, the latter does not form lime scale or cause corrosion of the parts of the water supply system located at the well.

When replacing or replenishing the supply of sequestering material in the storage chamber, it is only necessary to remove the ventilating cap 44 and fill the chamber from the top of the well. Since the drop pipe is attached to the housing 41, and the latter is secured to the adapter unit which has the delivery pipe affixed thereto, it is apparent that the water treatment apparatus 10, the adapter unit 16, the delivery pipe 25 and the pump equipment 28 attached thereto may be easily removed from the well by withdrawing the drop pipe therefrom.

We claim:

1. In a water supply system including a well casing, pump means including a delivery pipe in said casing for pumping the water from the well, means for connecting said delivery pipe to a distribution line externally of said well casing, means disposed within said well casing for storing a quantity of solid material for sequestering dissolved solids, means communicating with said delivery pipe for feeding water from the delivery pipe to the storing means in response to the pumping of water through said delivery pipe, and means communicating with the storing means for discharging the water therefrom containing dissolved sequestering material into the water in the well.

2. In a water supply system including a well casing, means defining a lateral discharge outlet on said well casing below the upper end thereof, an adapter unit removably disposed in said well casing having a downwardly facing opening, means including said adapter unit defining a sealed passage extending between said opening and the discharge outlet, a water treating apparatus including a storage chamber for water soluble material for sequestering dissolved solids attached to said adapter unit to extend thereabove in said casing, a delivery pipe attached to said adapter unit in communication with said opening and extending downwardly in said casing to a point below the liquid level therein, means for pumping water from the well through said delivery pipe to said lateral discharge outlet, means for supplying water from the delivery pipe to the water treating apparatus in response to the pumping of water through the delivery pipe, and means for feeding the water containing dissolved sequestering material from the treating apparatus to the water in said well casing below said adapter unit.

3. In a water supply system including a well casing, means defining a lateral discharge outlet on said well casing below the upper end thereof, an adapter unit removably disposed in said well casing having a downwardly facing opening, means including said adapter unit defining a sealed passage extending between said opening and the discharge outlet, a water treating apparatus including a storage chamber for water soluble material for sequestering dissolved solids attached to said adapter unit to extend thereabove in said casing, a delivery pipe attached to said adapter unit in communication with said opening and extending downwardly in said casing to a point below the liquid level therein, pump means for pumping water from the well through said delivery pipe to said discharge outlet, means for supplying water from the delivery pipe to the water treating apparatus in response to the pumping of water through the delivery pipe, means for feeding water containing dissolved sequestering material from the adapter unit to the well casing below the adapter unit, and a hollow drop pipe attached to said storage chamber in communication therewith and extending to the upper end of said well casing and defining a sealed passage extending from the upper end of the well casing to the storage chamber to permit sequestering material to be supplied through said drop pipe to said storage chamber.

4. In a water supply system including a well casing, means defining a lateral discharge outlet communicating with said well casing below the upper end thereof, an adapter unit removably disposed in said well casing having a downwardly facing opening, means including said adapter unit defining a sealed passage extending between said opening and the discharge outlet, a water treating apparatus including a housing attached to said adapter unit and extending upwardly therefrom in said casing, a delivery pipe attached to said adapter unit in communication with said opening and extending downwardly in said casing to a point below the liquid level therein, pump means for pumping water from the well through said delivery pipe to said discharge outlet, a vertically disposed partition in said housing separating the latter into a storage compartment for a solid material for sequestering dissolved solids and an outlet compartment, an inlet conduit communicating at one end with said delivery pipe and extending upwardly into said storage compartment to a point above the level of the sequestering material therein for feeding water from the delivery pipe to the treatment apparatus in response to pumping of water through the delivery pipe, said partition having an opening adjacent the lower end thereof providing fluid communication between said storage compartment and said outlet compartment, and means communicating said outlet compartment with said well casing below said adapter unit.

5. In a water supply system including a well casing, means defining a lateral discharge outlet communicating with said well casing below the upper end thereof, an adapter unit removably disposed in said well casing having a downwardly facing opening, means including said adapter unit defining a sealed passage extending between said opening and the discharge outlet, a water treating apparatus including a housing attached to said adapter unit and extending upwardly therefrom in said casing, a delivery pipe attached to the adapter unit in communication with said downwardly facing opening and extending downwardly in the well casing to a point below the liquid level therein, means for pumping water from the well casing through said delivery pipe to said lateral outlet, a vertically disposed partition in said housing separating the latter into a storage compartment for a solid water soluble material for sequestering dissolved solids and an outlet compartment, said partition having an opening therein below the upper end thereof, an inlet conduit communicating at one end with said downwardly facing opening in said adapter unit and extending upwardly in said storage compartment for feeding water thereto from the delivery pipe in response to pumping of water through the delivery pipe, and an outlet conduit extending through said adapter unit and upwardly in said outlet compartment to a point above said opening in the partition.

6. The combination of claim 5 including flow restriction means in the inlet conduit limiting the flow therethrough into the storage chamber.

7. In a water supply system including a well, means defining a flow passage extending from a point below the liquid level in the well to a point externally of the well for delivering water therefrom, means for pumping water from the well through said flow passage, a receptacle, a quantity of water soluble material for sequestering dissolved solids disposed in said receptacle, said material being solid and having a low solubility rate in water, means communicating with said flow passage for supplying water from said flow passage to said receptacle, and means communicating with said receptacle and extending into the well for feeding water containing dissolved sequestering material from said receptacle to the water in the well during operation of said pumping means to pump water from the well.

8. In a water supply system including a well, means defining a flow passage extending from a point below the liquid level in the well to a point externally of the well for delivering water therefrom, means for pumping water from the well through said flow passage, a receptacle containing a quantity of sequestering material of the glassy phosphate type having a low solubility rate in water, means communicating with the flow passage and responsive to the pumping of water therethrough for passing water from said flow passage to said receptacle, means defining an outlet chamber alongside the receptacle and communicating with the latter adjacent the lower end thereof, and means communicating with said outlet chamber above the lower end of said receptacle for passing water and dissolved sequestering material from the outlet chamber into the well.

9. In a water supply system including a well, means defining a flow passage extending from a point below the liquid level in the well to a point externally of the well for delivering water from the well, pump means connected to the lower end of the flow passage for pumping water upwardly therethrough, a check valve in said flow passage for preventing return flow of water therethrough, and means communicating with said flow passage between said pump means and said check valve and responsive to the pumping of water through said flow passage for feeding water containing a water soluble sequestering material for sequestering dissolved solids to the water in the well while said pump means is operating.

10. In an underground pitless discharge unit including an annular discharge head having a lateral discharge outlet, an adapter unit removably disposed in said discharge head and extending thereacross, said adapter unit having a downwardly facing water inlet, means in said adapter unit and discharge head defining a sealed passage extending between said water inlet and said discharge outlet, a water treating apparatus including a storage chamber for water soluble material for sequestering dissolved solids attached to said adapter unit and extending upwardly therefrom, said adapter unit having a first passage means communicating with said water inlet and with said chamber for supplying water from said water inlet to said chamber, said adapter unit having a second passage means extending from said chamber downwardly through the adapter unit and opening at the underside thereof for discharging water containing dissolved sequestering material from the chamber.

11. In a water supply system comprising a well, a pipe extending into the well having an inlet adjacent the lower end thereof and an outlet for delivering water from the well, pump means for pumping water from the well through said pipe to said outlet, and means responsive to operation of said pump means for feeding water containing a water soluble material for sequestering dissolved solids to the water in the well while said pump means is operating, said feeding means including means for storing a quantity of water soluble material for sequestering dissolved solids, inlet passage means communicating with said pipe and with said storing means for conveying a stream of water from the pipe to the storing means when the pump means is operated, and discharge passage means communicating said storing means with said well externally of said pipe for delivering water containing dissolved sequestering material from said storing means to the water in the well whereby to treat the well water before it is pumped from the well through said pipe.

12. In a water supply system including a well, pump means for pumping water from the well, a delivery pipe extending upwardly in the well from said pump means and having an outlet, a check valve in said delivery pipe above said pump means, and means disposed within said well and responsive to operation of said pump means for feeding water containing a water soluble material for sequestering dissolved solids to the water in the well while said pump means is operating, said feeding means including means for storing a quantity of water soluble material for sequestering dissolved solids, inlet passage means communicating with said pipe between said pump means and said check valve for conveying a stream of water therefrom to said storing means while said pump means is operating, and a discharge passage communicating with said storing means and with said well externally of said pipe for delivering water containing dissolved sequestering material to the water in the well in response to the flow of water through said inlet passage means whereby to treat the well water before it is pumped from the well through said pipe.

13. In a water supply system including a well casing, a lateral discharge outlet on said well casing below the upper end thereof, an adapter unit removably disposed in said well casing having a downwardly facing opening and a sealed passage connecting the downwardly facing opening and the discharge outlet, a delivery pipe attached to said adapter unit and extending downwardly in said casing to a point below the liquid level therein, a water treating apparatus including a storage chamber for water soluble material for sequestering dissolved solids mounted on said adapter unit, an inlet conduit having a flow restriction therein and communicating with said delivery pipe for supplying water at a preselected rate to the water treating apparatus in response to the flow of water through said pipe, and an outlet conduit for conveying the water containing dissolved sequestering material from the treatment apparatus to the water in the well casing below said adapter unit.

14. In a water supply system including a well casing, a lateral discharge conduit on said well casing below the upper end thereof, an adapter unit removably disposed in said well casing having a downwardly facing opening and a sealed passage communicating said opening with the discharge outlet, a water treating apparatus including a storage chamber for water soluble material for sequestering dissolved solids attached to said adapter unit to extend thereabove in said casing, a delivery pipe attached to said adapter unit in communication with said opening and extending downwardly in said casing to a point below the liquid level therein, means for supplying water from the delivery pipe to the water treating apparatus in response to the flow of water through the delivery pipe, means for feeding water containing dissolved sequestering material from the treatment apparatus to the well casing below said adapter unit, and a drop pipe attached to said storage chamber and extending to the upper end of said casing to permit withdrawal of said storage chamber, adapter unit and delivery pipe from said well casing.

References Cited in the file of this patent
UNITED STATES PATENTS

| 168,952 | Young | Oct. 19, 1875 |
| 2,089,035 | Oberlin | Aug. 3, 1937 |
| 2,099,836 | Blanchard et al. | Nov. 23, 1937 |
| 2,163,436 | Raymond et al. | June 20, 1939 |
| 2,182,286 | Doennecke et al. | Dec. 5, 1939 |
| 2,601,395 | Hatch | June 24, 1952 |

FOREIGN PATENTS

| 593,813 | France | June 6, 1925 |

UNITED STATES PATENT OFFICE

CERTIFICATE OF CORRECTION

Patent No. 2,891,622 June 23, 1959

Glenn A. Patterson et al.

It is hereby certified that error appears in the printed specification of the above numbered patent requiring correction and that the said Letters Patent should read as corrected below.

Column 4, line 72, column 5, lines 18, 44, and 72, for "means", each occurrence, read -- a discharge head on said well casing --; column 4, line 74, column 5, lines 20, 45, and 74, for "well casing", each occurrence, read -- discharge head --; column 4, line 75, and column 5, lines 21, 47, and 48, and line 75, for "means including", each occurrence, read -- said discharge head and --.

Signed and sealed this 26th day of January 1960.

(SEAL)

Attest:

KARL H. AXLINE
Attesting Officer

ROBERT C. WATSON
Commissioner of Patents